(12) United States Patent
Yamazaki et al.

(10) Patent No.: US 6,305,481 B1
(45) Date of Patent: Oct. 23, 2001

(54) CLUTCH MECHANISM FOR USE IN A POWER-DRIVEN TOOL

(75) Inventors: Takashi Yamazaki; Zenichi Oda; Katsumi Tozawa, all of Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 08/796,803

(22) Filed: Feb. 6, 1997

(30) Foreign Application Priority Data

Feb. 13, 1996 (JP) .................................................. 8-025567

(51) Int. Cl.[7] .............................. B23Q 5/04; F16D 43/204
(52) U.S. Cl. ........................ 173/178; 173/216; 192/56.62
(58) Field of Search .................... 173/176, 178, 173/216; 192/56.54, 56.57, 56.62; 464/36

(56) References Cited

U.S. PATENT DOCUMENTS

| | | | |
|---|---|---|---|
| 3,187,865 | * 6/1965 | Blachowski | 173/178 |
| 3,494,429 | * 2/1970 | Amtsberg et al. | 173/178 |
| 3,722,644 | * 3/1973 | Steinhagen | 192/56.57 |
| 3,970,151 | * 7/1976 | Workman, Jr. | 173/178 |
| 4,007,818 | * 2/1977 | Orwin | 192/56.57 |
| 4,548,305 | * 10/1985 | Anderson | 192/56.54 |
| 4,836,349 | * 6/1989 | Sakamoto et al. | 173/178 |
| 4,898,249 | * 2/1990 | Ohmori | 173/176 |
| 4,913,242 | * 4/1990 | Lo | 192/56.57 |
| 4,934,494 | * 6/1990 | Fushiya et al. | 192/56.62 |
| 5,277,527 | 1/1994 | Yokota et al. | 408/139 |
| 5,356,350 | 10/1994 | Schreiber | 475/153 |
| 5,385,512 | 1/1995 | Molenaar et al. | 475/153 |
| 5,449,043 | 9/1995 | Bourner et al. | 173/178 |
| 5,550,416 | * 8/1996 | Fanchang et al. | 173/216 |
| 5,778,989 | * 7/1998 | Neumaier | 173/178 |

FOREIGN PATENT DOCUMENTS

| | | |
|---|---|---|
| 57-1393 | 1/1982 | (JP) . |
| 6-39364 | 5/1994 | (JP) . |

* cited by examiner

*Primary Examiner*—Jessica J. Harrison
*Assistant Examiner*—John Paradiso
(74) *Attorney, Agent, or Firm*—Foley, Hoag & Eliot LLP (57) ABSTRACT

A lock washer (24) presses balls (21) and pins (23) against a clutch cam (18) with protrusions (19) formed on its front face. A rear end (25a) of a spring holder (25) abuts on the inner edge of the front face of the lock washer (24) while the half of the front end surface of each pin (23) abuts on the rear face of the outer edge of the lock washer (24). Furthermore, the compression spring (26) also abuts on the lock washer (24) with its outer edge approximately aligned with the outer edge of the lock washer (24). Therefore, if a large load is instantaneously applied to a spindle (11) at the end of screw tightening, the outer edge of the lock washer (24) deforms forward. This in turn causes the balls (21) to ride over the protrusions (19) of the clutch face, thus allowing a slight rotation of the internal gear (10c). This clutch operation lessens the impact that occurs at the end of screw tightening, serving to protect the tool mechanism and to reduce the shock to the operator's hand.

5 Claims, 6 Drawing Sheets

PRIOR ART

Fig 6

CLUTCH MECHANISM FOR USE IN A POWER-DRIVEN TOOL

BACKGROUND OF THE INVENTION

1. Field of the Invention

The present invention relates to a clutch mechanism provided in a power-driven tool, such as a power-driven screwdriver and a power-driven hammer drill. More particularly, the present invention relates to a clutch mechanism for use in a power-driven tool that can adjust torque transmitted to the attached bit.

2. Description of the Prior Art

Figure 6:
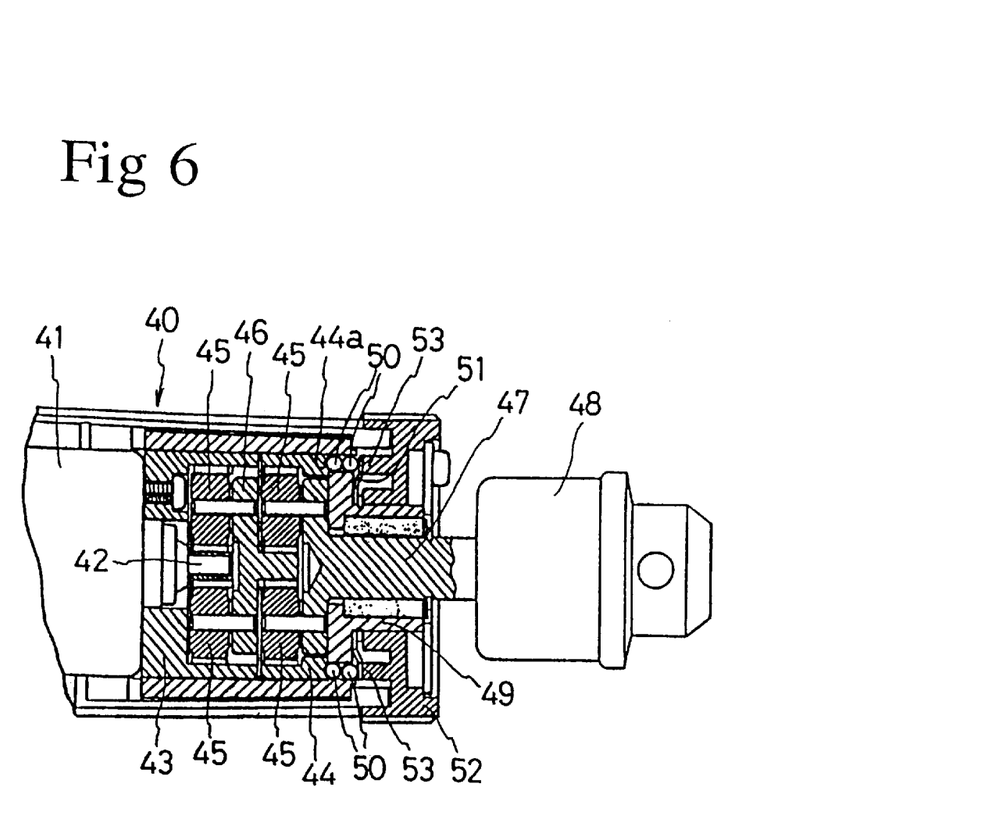
FIG. 6 is a partially cutaway side elevation of a conventional clutch mechanism as applied to a screwdriver/drill.

FIG. 6 shows a power-driven screwdriver 40 as disclosed in Japan Published Examined Patent Application No. S57-1393. In this screwdriver, the torque or a motor 41 is transmitted from a motor shaft 42 to a spindle 47 while being decelerated by a deceleration mechanism which includes planetary gears 45 engaged with internal gears 43 and 44 and a carrier 46 supporting the planetary gears 45. The torque eventually rotates a tool bit held by a chuck 48. The internal gear 44 is rotatably mounted in the deceleration mechanism and has on its front end a clutch face 44a. Balls 50 inserted in through-holes are formed in a gear case 49 which supports the spindle 47. The balls 50 are pressed against the clutch face 44a by a leaf spring 51. Provided in front of (toward the chuck 48) the leaf spring 51 is a clutch handle 52 with pressure protrusions 53 formed thereon. The clutch handle 52 is axially movable between a front position and a rear position where the pressure protrusions 53 are in abutment with the leaf spring 51.

When the clutch handle 52 is moved to the rear position, the pressure protrusions 53 presses the balls 50 against the clutch face 44a via the leaf springs 51. Even if a large load is applied to the spindle 47, the balls 50 cannot ride over the clutch face 44a, thus keeping the clutch engaged. In this so-called drill mode, the internal gear 44 continues to be prevented from rotating, so that the rotation of the motor 51 continues to be transmitted to the spindle 41 even if an excessive load develops.

When the clutch handle 52 is moved forward, the pressure protrusions 53 are detached from the leaf spring 51, allowing it to deform in the axial direction. The spring force of the leaf spring 51 sets the torque at which the internal gear 44 starts to rotate (this torque is referred to as "rotation-start torque" hereinafter). If a large load exceeding the rotation-start torque of the internal gear 44 is applied to the spindle 47, the balls 50 ride over the clutch face 44a. This causes the internal gear 44 to rotate idly. In this so-called screwdriver mode, the clutch is disengaged to prevent the rotation of the motor 51 from being transmitted to the spindle 41 if an excessive load develops.

Japan Published Unexamined Utility Model Application No. H6-39364 discloses another power-driven tool with a torque adjustment device. The tool comprises a compression spring for biasing a plate backward against balls (corresponding to the balls 50 in the foregoing example). The tool also includes a spring holder for adjusting the compression of the spring. When the spring is fully compressed, the tool is placed in the drill mode, in which the balls do not ride over the clutch face. When the spring is not fully compressed, the tool is placed in the screwdriver mode with the rotation-start torque corresponding to the spring compression set for the internal gear. If a load exceeding this rotation-start torque is applied to the internal gear, the balls ride over the clutch face, thereby causing the internal gear to rotate idly.

In either of the aforementioned clutch mechanisms, however, if the tool is mistakenly used as a screwdriver when the drill mode is selected, the spindle is locked as the screw is tightened since the clutch cannot be disengaged, causing an abrupt impact to be transmitted from the tool bit to the tool mechanism, sometimes damaging the gear case, the planetary gears, and other parts of the tool. Moreover, jolts are transmitted to the operator's hand.

SUMMARY OF THE INVENTION

In view of the above-identified problems, an object of the present invention is to provide in a power-driven tool a clutch mechanism that can lessen an impact transmitted to the tool mechanism when large torque is applied in the drill mode.

It is another object of the present invention to provide a power-driven tool that can avoid damage to the tool mechanism otherwise caused by such impacts.

It is still another object of the present invention to provide a power-driven tool with pleasant handling during operation.

The above and other related objects are realized by providing a clutch mechanism for use in a power-driven tool, comprising: a freely rotatable gear of a deceleration mechanism interposed between a motor and a spindle, a clutch assembly provided on the freely rotatable gear, a plate member abutting on the clutch assembly, a biasing means for biasing the clutch assembly via the plate member, and an adjustment means for adjusting the biasing force of the biasing means and for applying force to the plate member to prevent the plate member from moving, whereby torque at which the freely rotatable gear starts to rotate can be set by adjusting, with the adjustment means, the biasing force of the biasing means applied to the clutch assembly, the plate member being elastic so as to allow the freely rotatable gear to rotate when a load greater than a predetermined level is applied to the spindle even if the plate member is prevented from moving by the adjustment means.

Preferably, the part of the plate member to which the force that prevents the plate member from moving is applied is not axially aligned with the part of the plate member which abuts on the clutch assembly.

In carrying out the invention in one preferred mode, the plate member is a washer provided with a means for preventing the rotation thereof.

In this mechanism, the clutch assembly preferably comprises a clutch cam with a plurality of protrusions formed on an end surface thereof, a flange formed on the freely rotatable gear, the flange having a plurality of through-holes formed therein, and a plurality of balls retained in the through-holes of the flange, the balls being pressed against the end surface of the clutch cam by the biasing means.

Preferably, the freely rotatable gear is an internal gear and the biasing means is a compression spring.

In a preferred mode of the present invention, the adjustment means comprises a gear case which supports the spindle, the gear case being provided with an externally threaded portion, and a spring holder provided with an internally threaded portion engaging the externally threaded portion.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

A preferred embodiment of the present invention will be explained hereinafter with reference to the attached drawings.

Figure 1:
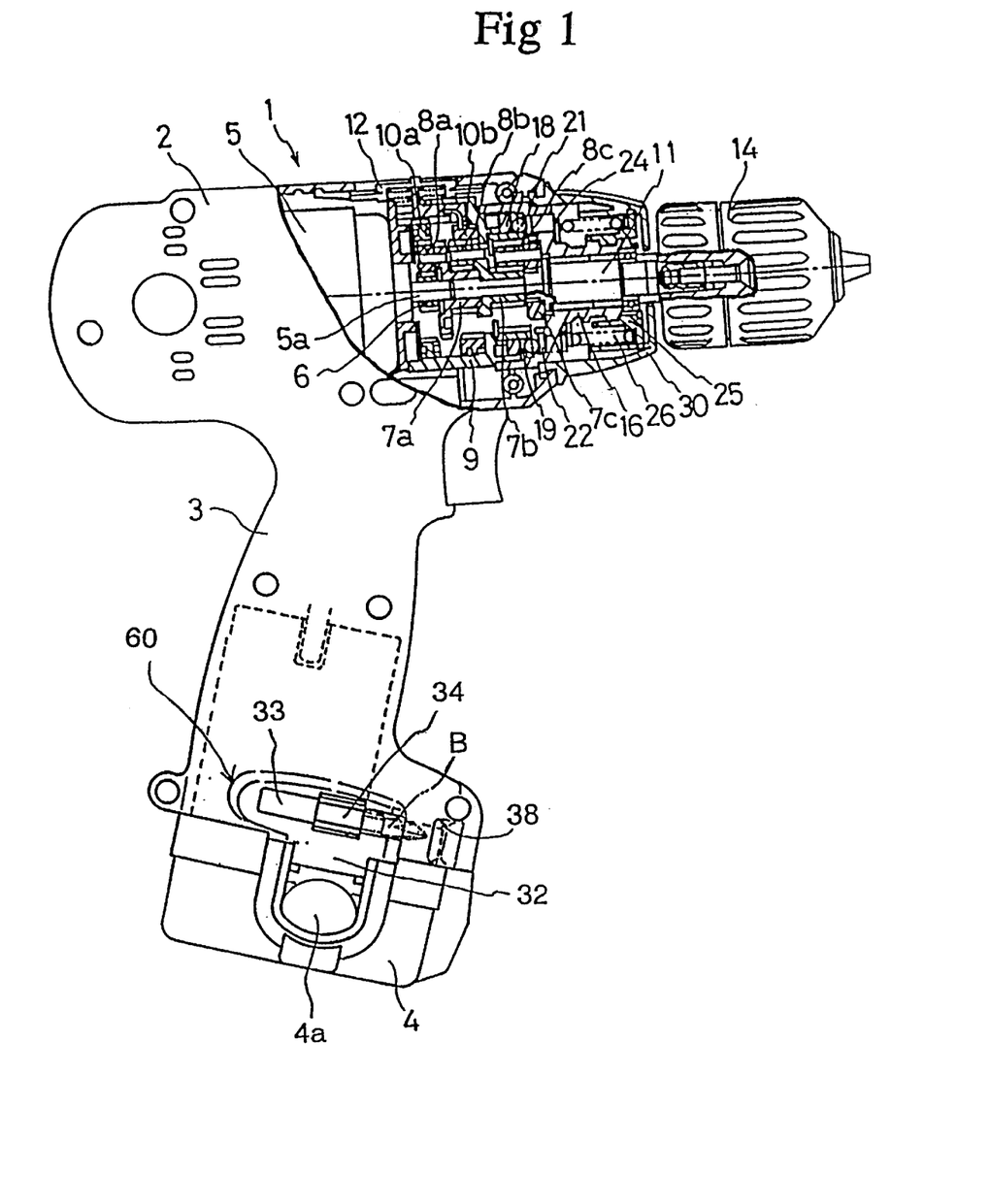
FIG. 1 is a partially cutaway side elevational view of a screwdriver/drill in partial cross section in accordance with the present invention.
Figure 3:
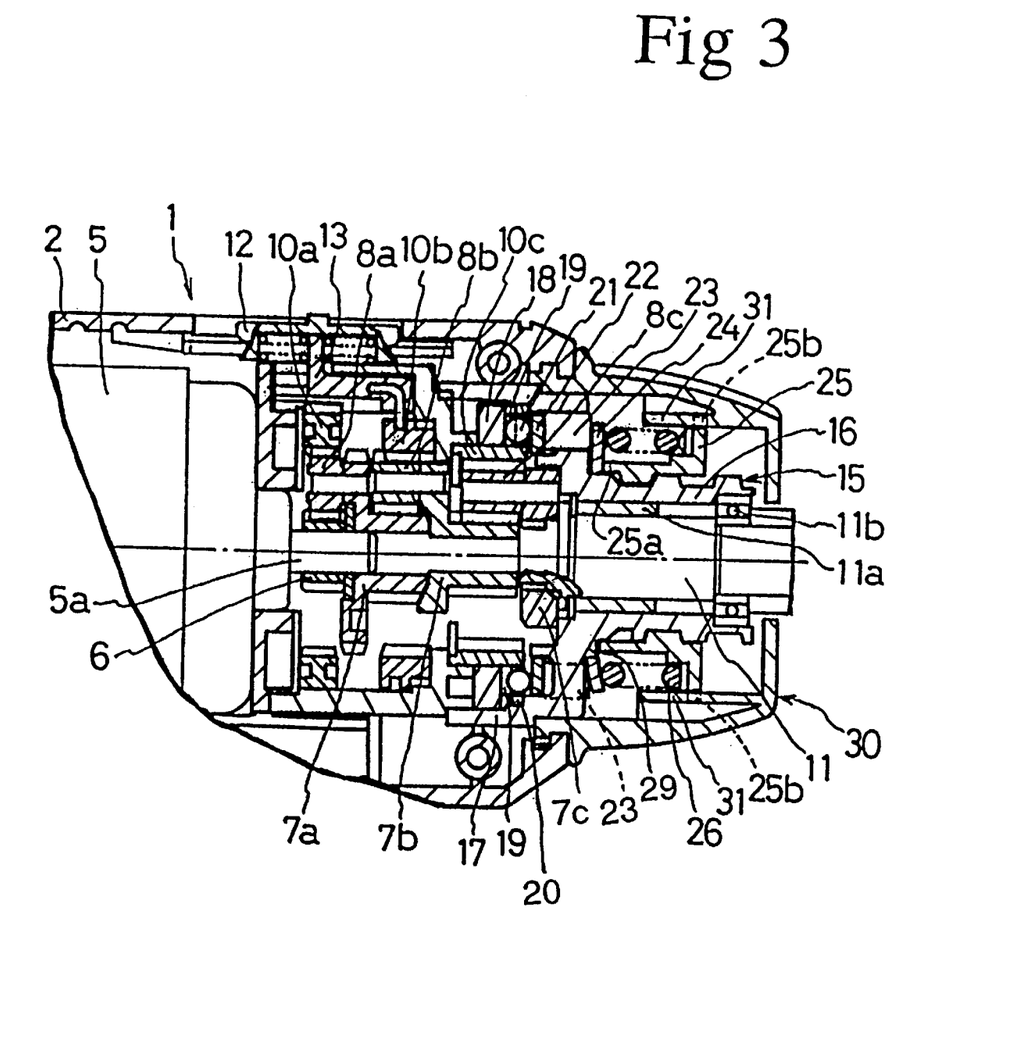
FIG. 3 is a partial cross sectional side elevational view of the screwdriver/drill of FIG. 1 in the drill mode.

Referring to FIGS. 1 and 3, reference numeral 1 designates a rechargeable-battery operated screwdriver/drill encased in a housing 2. A battery pack 4 is mounted in the lower end of a handle 3 as a power source. A motor 5 is contained in the rear (on the left side in FIG. 1) of the housing 2. The motor 5 has a motor shaft 5a with a pinion gear 6 formed therearound. The pinion gear 6 engages with three planetary gears 8a supported by a carrier 7a. When the motor 5 operates, the planetary gears 8a revolve around an internal gear 10a which is fixed to a gear case 9, thereby rotating the carrier 7a, which in turn rotates three planetary gears 8b which revolve around a second internal gear 10b, thus rotating a second carrier 7b. In a similar manner, the rotation of the motor 5 is transmitted to a carrier 7c via the second carrier 7b and three planetary gears 8c revolving around a third internal gear 10c. Subsequently, a spindle 11 is rotated as the carrier 7c is engaged therewith. The rotational speed of the motor 5 is reduced through the three-tier deceleration mechanism as it is transmitted to the spindle 11. Reference numeral 14 designates a chuck provided at the end of the spindle 11 for releasably holding a bit.

Also, a change-over lever 12 exposed on the housing 2 is connected to the second internal gear 10b via a connecting member 13. The change-over lever 12 is axially slidable to move the second internal gear 10b between a forward position for producing a low rotational speed of the spindle 11 and a rear position for producing a high rotational speed. In the forward position, the second internal gear 10b is prohibited from rotating as it is fixed to the gear case 9 while engaging only with the planetary gears 8b. In the rear position, the second internal gear 10b engages with both the carrier 7a and the second planetary gears 8b so as to rotate idly.

Still referring to FIG. 3, another gear case 15 is coaxially fastened to the gear case 9 with screws. The second gear case 15 comprises a small diameter portion 16 which supports the spindle 11 via a pair of bearings 11a and 11b and a large diameter portion 17 located at the rear of the small diameter portion 16. An annular clutch cam 18 is integrally provided on the large diameter portion 17 and placed around the third internal gear 10c with clearance therebetween. The front end surface of the clutch cam 18 is formed as a clutch face with three trapezoidal protrusions 19 provided thereon at regular intervals. Formed around the front end of the internal gear 10c is a flange 20 which is located in front of the clutch cam 18. The flange 20 has three through-holes formed therein at regular intervals in each of which a ball 21 is retained. Further, six pins 23 axially penetrating the front end of the large diameter portion 17 are provided at regular circumferential intervals in front of the balls 21. A washer 22 is interposed between the balls 21 and the pins 23. A lock washer 24 as a plate member is placed around the small diameter portion 16, abutting on the front ends of the pins 23. Also, the lock washer 24 is biased in the rear direction by a compression spring 26 which is interposed between the washer 24 and a spring holder 25 engaging a threaded portion of the small diameter portion 16. Thus biased, the lock washer 24 presses the balls 21 against the clutch face via the pins 23 and the washer 22. It should be noted that although it can rotate, the flange 20 and thus the internal gear 10c are normally prevented from rotating by the balls 21 being pressed against the clutch cam 18.

Figure 2:
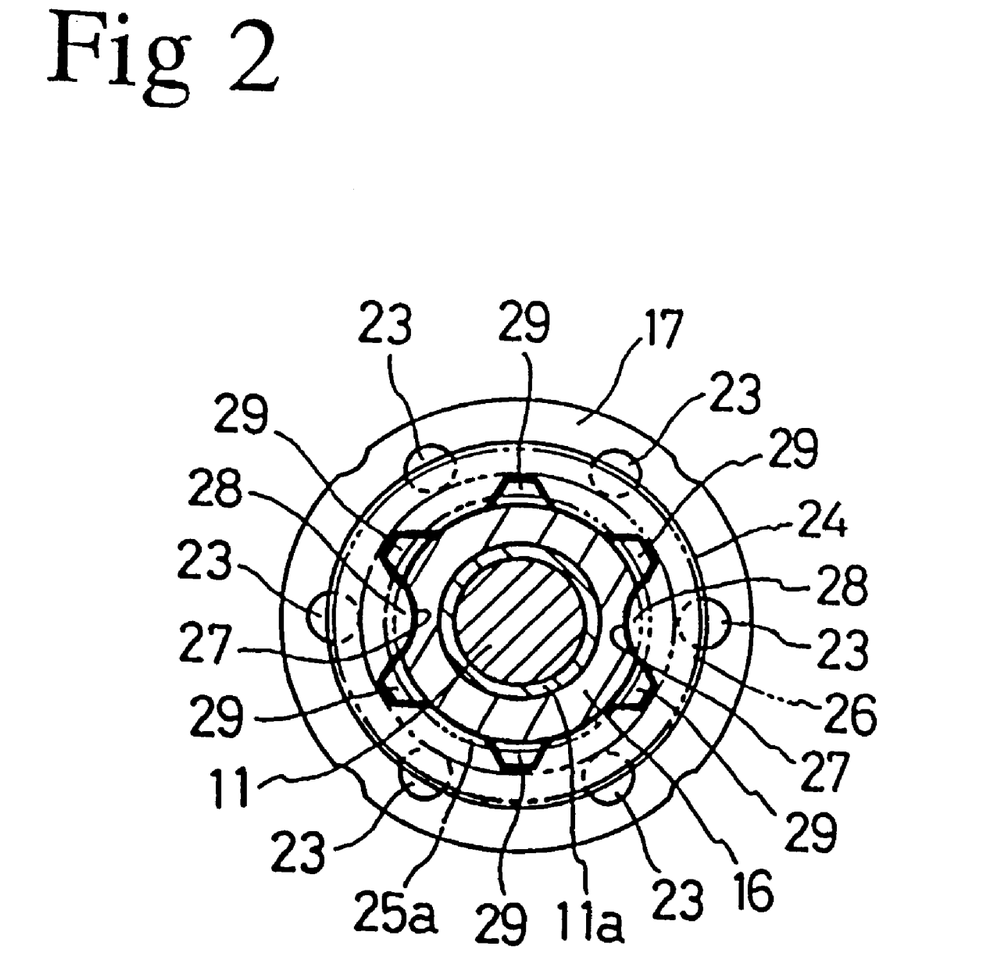
FIG. 2 is a front elevational view of the lock washer of the screwdriver/drill of FIG. 1.

With specific reference to FIG. 2, the lock washer 24 has a pair of protrusions 28 formed on the inner periphery thereof which fit into a pair of U-shaped axial grooves 27 formed in the small diameter portion 16 of the gear case 15. Accordingly, the lock washer 24, when fitted on the small diameter portion 16, is prevented from rotating. The lock washer 24 is further provided with radial recesses in the inner periphery thereof that receive reinforcing ribs 29 radially projecting from the rear end of the small diameter portion 16. Besides additionally preventing the rotation of the lock washer 24, the reinforcing ribs 29 protect the washer 16 from the bending stress transmitted from the bit and applied to the small diameter portion 16. The ribs 29 also serve as a protection against the tensile force that is applied to the small diameter portion 16 when the spring holder 25 is thrust forward during clutch disengagement as will be described below in further detail.

Referring again to FIG. 3, the rear end 25a of the spring holder 25 abuts on the inner edge of the front face of the lock washer 24 while about half of the front end surface of each pin 23 abuts on the outer edge of the rear face of the lock washer 24. Furthermore, the compression spring 26 also abuts on the lock washer 24 with its outer edge approximately aligned with the outer edge of the lock washer 24.

A change ring 30 is rotatably fitted in the front end of the housing 2. A plurality of axial ribs 31 are formed in the inner surface of the change ring 30. The ribs 31 grip three protrusions 25b formed on the outer front periphery of the spring holder 25. Accordingly, rotation of the change ring 30 causes the spring holder 25 to also rotate, so that the spring holder 25 is axially screw-fed on the small diameter portion 16.

Figure 4:
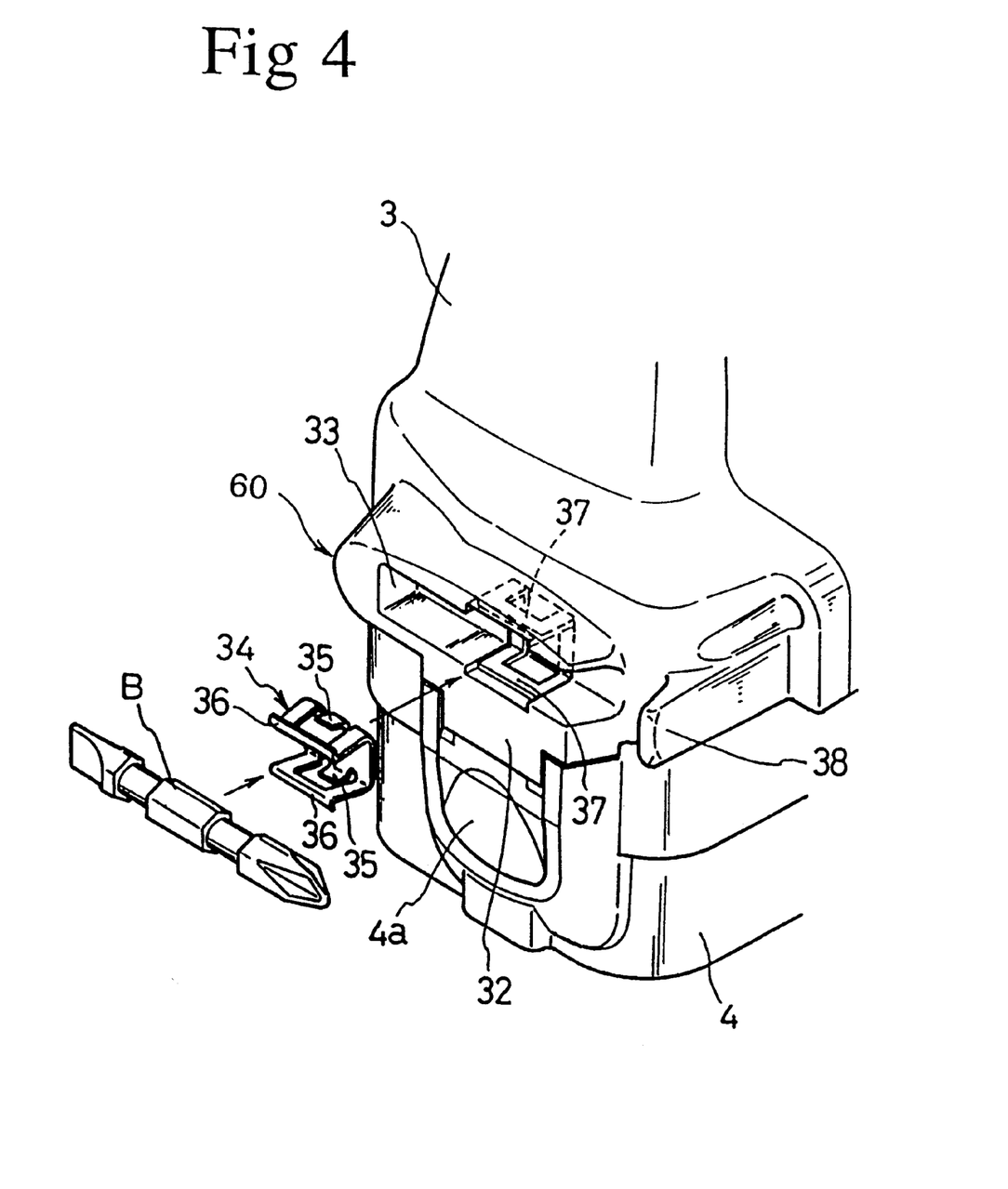
FIG. 4 is a perspective view of the right bit keeper of the screwdriver/drill of FIG. 1.
Figure 5:
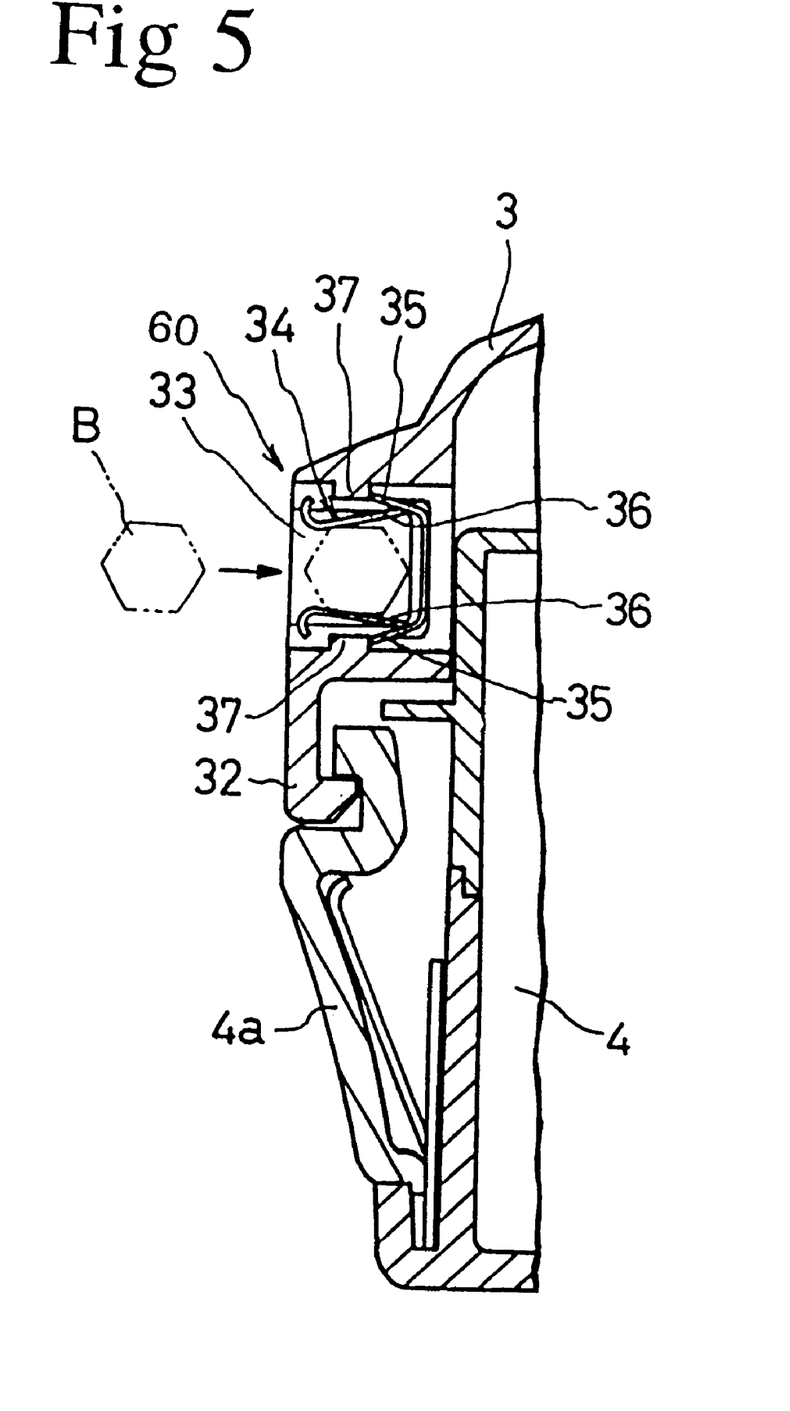
FIG. 5 is a cross sectional view of the right bit keeper of the screwdriver/drill of FIG. 1.

Referring to FIGS. 1, 4, and 5, a pair of bit keepers 60 are provided on the right and the left sides of the bottom portion of the handle 3 and are located above respective engagement portions 32 engaged with hook buttons 4a of the battery pack 4. Each bit keeper 60 comprises walls defining a groove 33 with an open front end. A U-shaped bit holder 34 is fitted into a matching recess formed slightly closer to the front end than in the middle of the groove 33. The bit holder 34 includes upper and lower elastic pieces 36 and upper and lower stoppers 35 which are cut and bent outwardly as clearly shown in FIGS. 4 and 5. When the bit holder 34 is fitted into the recess of the groove 33, the upper and lower stoppers 35 engage with respective square protrusions 37, thus preventing the bit holder 34 from slipping out of the groove 33. When a bit B is fitted into the bit holder 34, the elastic pieces 36 grip the bit B in the middle. As previously mentioned, the groove 33 has an open end for ease of removing the bit B therefrom (see FIG. 1). To prevent the Bit B from slipping off through the open end, a stopper lug 38 is projected from the bottom portion of the handle 3.

In this embodiment, the bit keepers 60 are provided on the bottom side portions of the handle 3 rather than on the side or lower portions of the housing, or on the grip of the handle as in conventional tools. This configuration enhances poor operability of such conventional tools caused by the additional structure on the housing. In this configuration bits can be stored where they least affect the operability of the tool in this configuration. Besides the locational advantage, the bit keepers 60 offer another advantage in that the bit holders 34 can be easily mounted because they require no screws or other members for mounting.

In the screwdriver/drill 1 thus constructed, the compression of the spring 26 can be adjusted by rotating the change ring 30 to screw-feed the spring holder 25 in the axial direction. When the spring holder 25 is located in a feed position where its rear end 25a does not abut on the lock washer 24 (see FIG. 1), the biasing force of the compression spring 26 in the feed position corresponds to the rotation-start torque of the internal gear 10c and prevents the internal gear 10c from rotating. (As mentioned before, the rotation-start torque means the torque at which the internal gear starts to rotate.) If a load exceeding the biasing force is applied to the spindle 11, the clutch is disengaged. That is, the balls 21 ride over the trapezoidal protrusions 19 of the clutch face, pressing the lock washer 24 in the forward direction against the biasing force of the compression spring 26. This causes the internal gear 10c to rotate idly. This position is normally selected to use the tool as a screwdriver as the torque is not transmitted to the spindle 11 when the screw is tightened. FIG. 1 above the alternate long and short dash line shows the internal gear 10c in normal lock position. Shown below the line is the internal gear 10c when the clutch is disengaged.

On the other hand, FIG. 3 shows the spring holder 25 in the rear feed position, in which its rear end 25a abuts on the lock washer 24. In this position, the lock washer 24 is firmly pressed against the large diameter portion 17 of the gear case 15. Therefore, the balls 21 cannot ride over the trapezoidal protrusions 19 on the clutch face, preventing the clutch from being disengaged. In other words, the internal gear 10c remains locked even if a heavy load is applied to the spindle 11, allowing the tool to be used as a drill (see the upper half of FIG. 3 above the center line).

The following describes the operation of the screwdriver/drill 1 if a screw is mistakenly tightened in this drill mode. As explained above, the rear end 25a of the spring holder 25, abutting against the lock washer 24, prevents it from moving in the axial direction in this mode. However, the rear end 25a is not aligned with the pins 23 across the lock washer 24 since the rear end 25a is in abutment on the inner edge of the lock washer 24 with the pins 23 in abutment on its outer edge. This arrangement allows the lock washer 24 to deform in the forward direction. Therefore, if a large load exceeding the maximum rotation-start torque of the internal gear 10c is instantaneously applied to the spindle 11 at the end of screw tightening, the outer edge of the lock washer 24 deforms forward. This causes the balls 21 to ride over the trapezoidal protrusions 19 of the clutch face, thus allowing a slight rotation of the internal gear 10c (see the lower half of FIG. 3 below the center line). This clutch disengagement lessens the impact that occurs when the screw is tightened, serving to protect the mechanism of the tool and to reduce the jolts to the operator's hand.

The spring load applied to the balls 21 is determined by the elasticity of the lock washer 24 and the biasing force of the compression spring 26. In this embodiment, the elasticity is set so as to cause the lock washer 24 to deform only when a large, instantaneous load is applied to the internal gear 10c due to an abrupt lock-up of the rotating spindle 11 as explained above. This causes no practical problem, however, when the tool performs drilling in the drill mode; the elasticity of the lock washer 24 is set so that the clutch remains engaged, thus maintaining the internal gear 10c in the lock-up condition.

The configuration of the lock washer can be modified as long as it is sufficiently elastic to allow the washer to deform in the above-described manner. For example, a simple circular washer with no internal recesses or protrusions may suffice. Alternatively, the washer may have on its outer periphery lugs or L-shaped protrusions on which the pins abut. Furthermore, the deformation of the lock washer, with respect to a given spring load, is determined by the thickness of the washer. To adjust the deformation, the thickness can be changed or a plurality of thinner washers may be stacked.

In the embodiment, the internal gear 10c is prevented from rotating by spring holder 25 abutting against the lock washer 24. However, the same effect can be obtained by adopting a construction similar to one of the aforementioned prior-art tools, in which the spring, when fully compressed, directly abuts against and firmly holds down the lock washer. It should be noted that also in this construction the balls and the compression spring must not be axially aligned with each other across the lock washer.

Moreover, the pins 23 and the washer 22 may be dispensed with so that the lock washer 24 can directly abut on the balls 21.

As there may be many other modifications, alterations, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A clutch mechanism for use in a power-driven tool, comprising:

a freely rotatable internal gear of a planetary gear interposed between a motor and a spindle, a clutch assembly provided on the freely rotatable internal gear, a plate member disposed so as to abut the clutch assembly, said plate member being biased by a biasing spring in order to keep the clutch assembly in an engaged state up to a release torque, and an adjustment means for adjusting the biasing force acting on the plate member in order to set the release torque of the clutch assembly, the plate member being fixable by means of said adjustment means for increasing the release torque of the clutch assembly, the plate member being elastic in order to release the engagement of the clutch assembly with the plate member in said engaged state, while said plate member is in a fixed position, when a selected maximum torque of the tool is exceeded.

2. A clutch mechanism in accordance with claim 1, wherein the part of the plate member to which the force that prevents the plate member from moving is applied is radially offset relative to the portion of the plate member which abuts on the clutch assembly.

3. A clutch mechanism in accordance with claim 2, wherein the plate member comprises a washer provided with a means for preventing the rotation thereof.

4. A clutch mechanism in accordance with claim 3, wherein the clutch assembly comprises a clutch cam with a plurality of protrusions formed on an end surface thereof, a flange formed on the freely rotatable internal gear, the flange having a plurality of through-holes formed therein, and a plurality of balls sized to be retained in the through-holes of the flange, the balls being positioned in the tool so as to be pressed against the end surface of the clutch cam by the biasing spring.

5. A clutch mechanism in accordance with claim 1, wherein the adjustment means comprises a gear case which supports the spindle, the gear case being provided with an externally threaded portion, and a spring holder provided with an internally threaded portion adapted for engaging the externally threaded portion of said gear case.

* * * * *